United States Patent [19]

Fane, III

[11] Patent Number: 4,546,211

[45] Date of Patent: Oct. 8, 1985

[54] REMOTE DIGITAL CONTROL TRANSMITTER DEVICE

[75] Inventor: William H. Fane, III, Crestwood, Ky.

[73] Assignee: MED-CALL, Louisville, Ky.

[21] Appl. No.: 419,042

[22] Filed: Sep. 16, 1982

[51] Int. Cl.$^4$ .......................................... H04M 11/04
[52] U.S. Cl. .................................. 179/2 A; 179/5 R; 340/825.07
[58] Field of Search .................. 179/2 A, 2 AM, 5 R, 179/5 P, 2 DP; 340/696, 502–504, 533–535, 539, 825.06–825.09, 825.16–825.19, 825.36, 825.37

[56] References Cited

U.S. PATENT DOCUMENTS

| | | | |
|---|---|---|---|
| 4,023,139 | 5/1977 | Samburg | 179/2 A X |
| 4,095,050 | 6/1978 | Beachem et al. | 179/2 A |
| 4,332,980 | 6/1982 | Reynolds et al. | 179/2 A |
| 4,375,637 | 3/1983 | Desjardins | 179/5 R X |

Primary Examiner—Gene Z. Rubinson
Assistant Examiner—W. J. Brady
Attorney, Agent, or Firm—Edward M. Steutermann

[57] ABSTRACT

A telecommunication system to operate a selected operating device including a digital code generating device to generate first and second coded signals having an actuating input to receive an actuating signal, a digital coded signal output where upon receipt of an actuating signal at the actuating input the digital code generator supplies the first coded signal to the digital coded signal output, and a receiver code input; receiver connected to the digital coded signal output having a receiver input to receive the first and second coded signals, a receiver code output connected to the receiver code input, and receiver code generator device to generate first receiver code signal to the digital code generator receiver code input in response to receipt of the first coded signal and supply a second receiver coded signal to the digital code generator receiver code input in response to receipt of the second coded signal where the first receiver coded signal causes the digital code generator to generate the second coded signal at the digital coded signal output which causes the receiver code generator device to generate the second receiver code; latch means operated by the digital code generator to actuate the operating device upon receipt of the activating signal; and a third receiver code generator to selectively provide a third receiver coded signal at the receiver code output to be received at the receiver code input to deactivate the latch means to terminate operation of the operating device.

12 Claims, 2 Drawing Figures

REMOTE DIGITAL CONTROL TRANSMITTER DEVICE

BACKGROUND OF THE INVENTION

The present invention relates to telecommunications equipment and particularly to a new and useful device which finds application in the transmission of a signal from a remote location to a receiver and provides the receiver with the ability to receive information from the remote location and to selectively disconnect the remote location because upon establishment of a communication path, for example, by means of a telephone line where the receiver achieves control of the transmitting line.

The prior art is replete with transmitting equipment where, upon activation, a transmitting unit, for example a digital dial transmitter or other similar devices can connect with a receiver, and transmit information to the receiver. However, no prior art devices are known where the remote transmitter is under the control of a receiver station that did not initiate the call.

In particular various prior art devices are known for emergency activation to transmit a distress signal or other information over telephone lines to a receiving station. In general such devices have been self terminating upon transmission of the signal to the remote location. This has eliminated the possibility of dual path communication between the remote station and the receiver where the receiver station has the ability to terminate the dual path communication at will.

Further no prior art device is known where an operator at a remote receiver station can initiate remedial action at the location of the initiating station.

SUMMARY OF THE INVENTION

The present invention provides a new and useful device for dual communication from a remote location to a receiver where the receiver maintains the ability to terminate the communication and to reset the device for receipt of communications from other locations.

The present invention has been found to be particularly useful as an emergency alarm system and simultaneous condition monitoring system where the device provides means for activation of the remote transmitter, acknowledgement of the receipt of the transmission by a receiver and immediately establishment of two way communication between the remote transmitter and the receiver so that an operator can remotely monitor the condition which may have initiated the operation of the receiver and can then terminate the monitoring at will.

In accordance with another feature of the present invention the operator at the receiver can then initiate other actions depending upon variations and modifications of the base device provided herein. For example, if the unit were being utilized for monitoring for fire or similar occurance the remote transmitter would be automatically initiated or activated by a smoke or fire detector means and the operator at the receiver station could, upon confirmation of the existance of a fire or other occurance initiate corrective action such as, for example, the operation of sprinklers.

Devices within the scope of the present invention further provide means to, for example, record from the base station, occurances at the remote station such as, for example the voices incident to a robbery in process or other such occurance where voice tapes can be provided for later identification of participants.

More particularly the present invention provides a telecommunication system including a digital code generating device to selectively generate first and second coded signals having at least one actuating input to receive an actuating signal, a digital coded signal output where upon receipt of an actuating signal at the actuating input the digital code generating device supplies the first coded signal to the digital coded signal output and a receiver code input; receiver means connected to the digital coded signal output having a receiver input to receive the first and second coded signals, a receiver code output connected to the receiver code input, and receiver code generator device to generate first receiver code signal to the digital code generating device receiver code input in response to receipt of the first coded signal, a second coded signal to the digital code generating device receiver code output in response to receipt of the second coded signal where the first coded signal causes the digital code generating device to generate the second coded signal at the digital coded signal output which causes the receiver code generator device to generate the second receiver code and a third receiver code generating device to selectively provide a third receiver coded signal at the receiver code output to be received at the receiver code input to deactivate the digital code generating device.

DETAILED DESCRIPTION OF THE DRAWINGS

Figure 1:
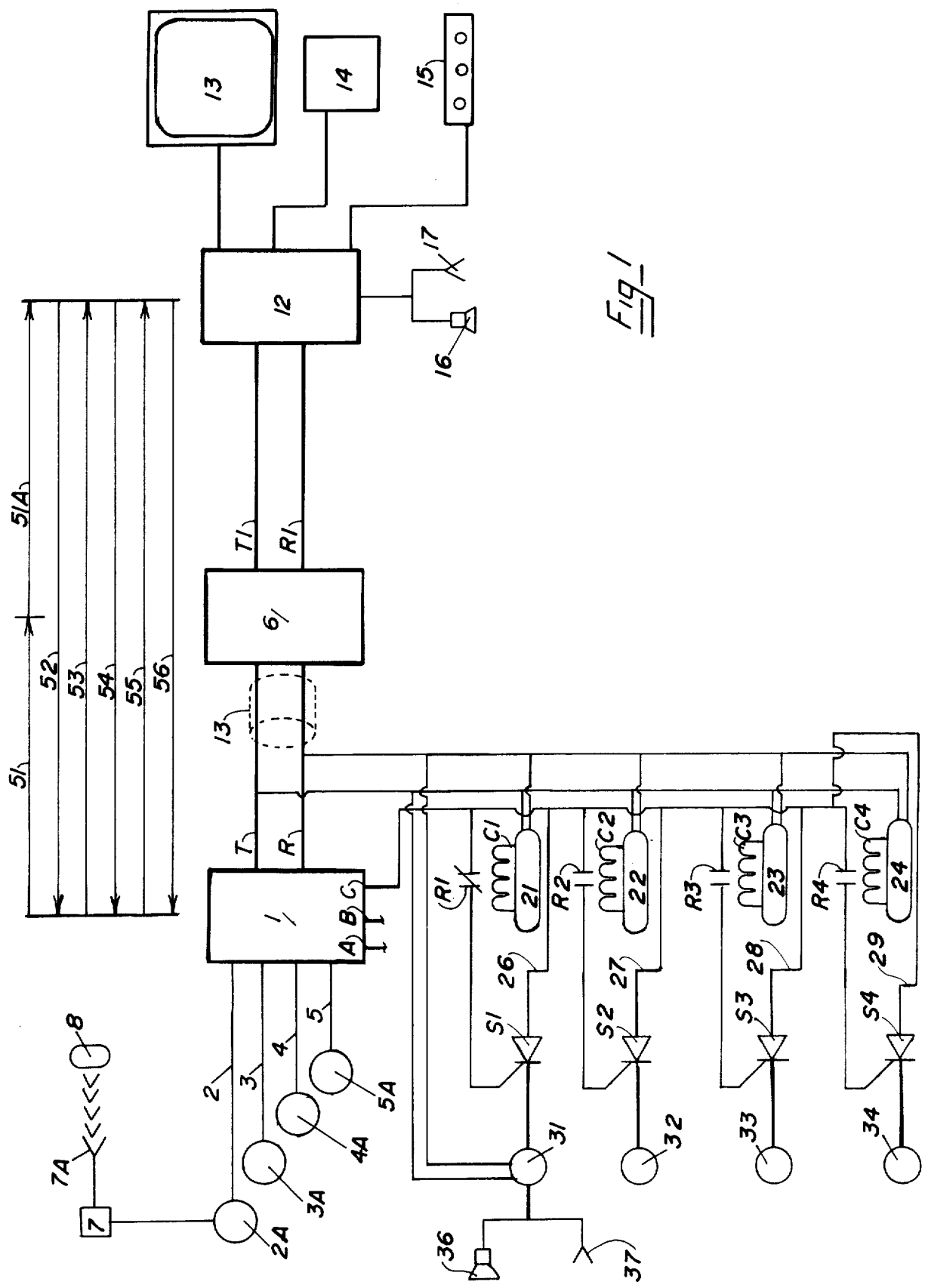
FIG. 1 is a schematic diagram of one example of a system within the scope of the present invention.
Figure 2:
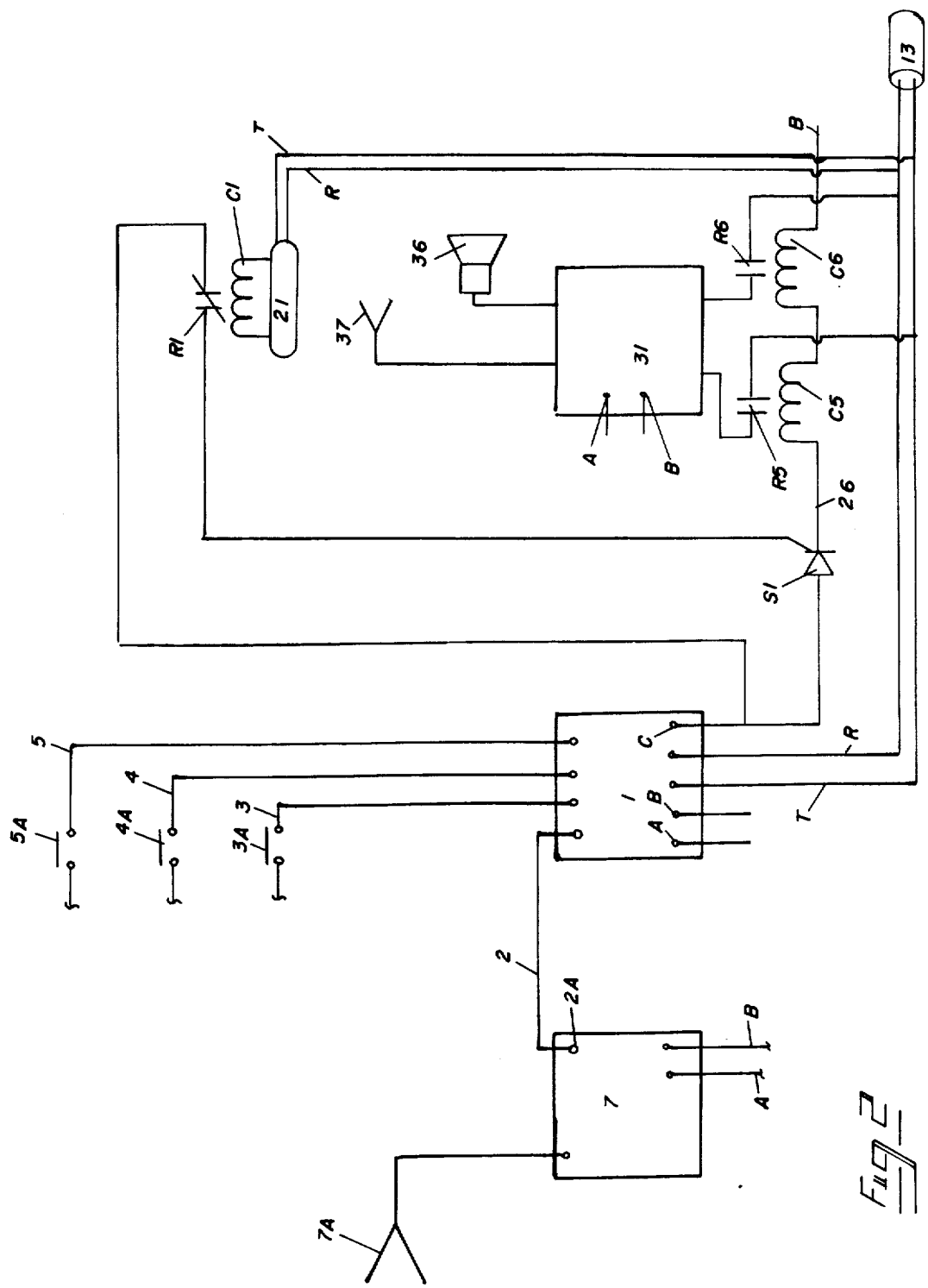
FIG. 2 is a more detailed schematic diagram of a portion of the device shown in FIG. 1.

FIG. 1 shows a radio frequency digital communicator 1, for example, a model DD1 digital communicator by Acron Corporation of Lakewood, N.J. which would be located at a remote location, for example in a home or business. Digital communicator 1 includes 4 inputs 2-5, each to be activated by a selected occurance to activate a selected response by the communicator as discussed hereinafter. While the inputs 2-5 can be activated by switches 2A-5A as shown in FIG. 2 such as fire monitors, burglary monitors, within the scope of the present invention one of the inputs, for example, input 2, can be activated by a radio frequency receiver 7 having an antenna 7A to receive a selected signal from a radio frequency transmitter 8 where receiver 7 is connected to input 2 to activate the input upon receipt of the signal by receiver 7.

The tip T and ring R outputs from the digital communicator are the typical tip and ring connections utilized in telephonic equipment. The T and R outputs are activated upon activation of the digital unit 1 and, upon activation send a signal, in this case a dial tone or standard dial pulse, to a central station 6 which initiates a ring signal by means of output lines T1 and R1 and in this case completes a connection to a receiver 12 where the telephone number of receiver 12 was dialed by communicator 1. The dial tone or dial pulse from communicator 1 is illustrated schematically in FIG. 1 as line 51 from communicator 1 to control station 6 while the dial and connecting mode is shown by numeral 51A. For purposes of discussions and for purposes of the claims apended hereto, it is assumed that the lines T and T, and R and R, are continuous and that the signals 51, 51A are simply one address signal from communicator 1 to receiver 12. Receiver 12 includes, for example, a microprocessor capable of reading coded instructions and can include a readout device, for example, a cathode ray tube 13 and in addition can include a memory storage device 14, a tone generating device 15 a speaker 16 and a microphone 17 as discussed hereinafter. Communicator 1 also includes positive and negative power inputs A and B as well as a power output C, for example a +5 voltage output.

As shown, the arrangement further includes decode devices 21-24 which are, for example decoders, as, for example, provided by Data Signal, Inc. of Albany, Ga. and capable of decoding digital or single tone frequency signals. Each of the decode devices 21-24 includes, usually internally, a relay, in this case relays R1-R4 where in the present application relay R1 is normally closed and relays R2-R4 are normally open. Relays R1-R4 are operated by coils C1-C4 provided in each of the decoders 21-24. The tip T and ring R connections from digital communicator 1 are provided to each of the decoder devices where the decode devices are capable of receiving and decoding specific signals provided on the T & R inputs that is on the telephone lines when the communicator has been established to the receiver 12. Each of the relays R1-R4 is provided to activate another relay device, in this case, a silicone control rectifier (SCR) S1-S4 where the relays R1-R4 is in series with the base of SCR's S1-S4.

Power from power source C is provided through leads 26-29 for selected activation of devices 31-34 through SCRs S1-S4 where activation of device 31 is discussed in detail hereinafter.

Digital communicator 1 shown in FIGS. 1 and 2 would normally be programed to dial successive or different telephone numbers upon receipt of a signal causing activation of one of the inputs 2-5. In the arrangement shown in Figures the device would normally be programed to dial one number and then to provide different signals at the output signal from the communicator to the central station. The actual sequence of communications will be discussed hereinafter but for purposes of illustration the activation of input 2 will be discussed, it being understood that similar occurances could be provided upon activation of any of the other inputs. In FIG. 1 the input 2 is activated by receipt of a signal from, for example, a radio frequency receiver 7 having an antenna 7A which receives a selected signal from a transmitter 8. In accordance with one feature of the present invention where the device is to be utilized as a medical alert system the transmitter 8 could be a pendant worn or carried by a patient who upon experiencing difficulty would activate the transmitter to provide the signal to antenna 7a to activate receiver 7 and input 2 to digital communicator 1.

Initially the device will be explained in terms of the activation of decode board 21 which activates an operating unit 31 to activate a speaker 36 and a microphone 37 in the vicinity of the patient.

Referring to FIG. 2 the digital communicator 1 is shown along with the radio frequency receiver unit 7. Unit 7 is connected to input 2 of the digital communicator unit and for purposes of illustration inputs 3, 4 and 5 have also been shown connected through switching devices 3A, 4A, and 5A.

The power supplies A and B are shown along with the connection R for the ring and connection T for the tip connection to cord 13.

The terminal C, the positive voltage supply in this case +5 volts is also shown. As shown switch SCR S1 is shown having its cathode connected through coils C5 and C6 of normally open relays R5 and R6 in tip and ring leads T and R connected to apparatus 31 which can, for example, be a hands free communication unit to activate a microphone 37 and a speaker 36 as previously described located near the point of activation of the unit. Relays R5 and R6 provide the latching mechanism to hold the hands free unit 31 on line once activated and until deactivated by decode device 21 as hereinafter described. Relay R5 is a normally open relay which connects, for example, the tip connection which closes the connection to the tip side of the telephone line. Likewise relay R6 is provided to close the connection to the ring side of the telephone line. Thus it will be seen that upon activation of terminal C by activation of receiver 7 the positive 5 volt power is supplied to relay R1 and the gate of SCR S1 so that output 26 is activated to activate coils C5 and C6 to pick relays R5 and R6 to place speaker 36 and microphone 37 on line to receiver 12. The hands free unit then stays activated so long as coil C1 is deactivated allowing relay R1 to remain in closed position and relays R5 and R6 closed.

By way of background it is to be understood that once the digital communicator is actuated the terminal C is likewise actuated supplying the positive 5 volt to the hands free unit 31 and immediately opens the communication path to speaker 36 and microphone 37. The sequence of occurances is as follows and illustrated schematically above FIG. 1. Intially, when transmitter 8 is activated, and activates receiver 7 to activate input 2 to digital communicator 1 a signal 51, for example a standard dial pulse or tone signal as shown is supplied to the central station 6. The signal 51 is transmitted through the central station to receiver 12 and in FIG. 1 shown as signal 51A which would be a ring signal. The signal is typically a dial signal, either a tone burst or a rotary pulse. Typically, the system operates on standard telephone company dial tone frequency (DTMF) signals. The central station 6 receives the dial signal 51 and generates a ring 51A which is received at receiver 12. When the ring signal is received and the connection complete the receiver 12 transmits a signal 52 which can be a characteristic tone burst or a digital signal which is recognized by the digital communicator and used to acknowledge the fact that the connections have been made and there is communication between the digital communicator and the receiving station. That is, the transmission path is open. In accordance with one feature of the present invention the digital communicator then generates a signal 53 which is characteristic of the identity of the person or device which generated the call and the signal is received by receiver 12 which decodes the signal and activates memory 14 to display selected information on the screen of display 13. At this point it must be understood that the initiating system need not be a person but could be an incident at a remote location which is to be monitored where the signal provided by the digital communicator would indicate the particular activative device.

Various features can be provided by the receiver 12 and in the arrangements shown the receiving device can access memory 14 and display information on CRT 12 related to the activating device or the activating person.

Additionally receiver 12 can be provided with a speaker 16 and a microphone 17 to initiate dual path communication to the location of the initiation of the signal or the original party. Upon receipt of signal 53 at receiver 12 a signal 54 is supplied to digital communicator 1 from receiver 12 which requests acknowledgement of signal 53. While it is not necessary within the invention for the acknowledgement to occur, in the arrangement shown the request for acknowledgement then generates a signal 55 which is the same as signal 53 in order for receiver 12 to confirm the original transmission and compare the transmissions.

Upon activation of input 2 of digital communicator 1 terminal C is activated as previously stated to activate the unit 31 so that upon activation of speaker 16 and microphone 17 by receiver 12 a two-way communication path is established over the telephone line 13. The system is now in a latched condition such that the communication path is maintained until interrupted by the original party. However in accordance with one feature of the present invention arrangement is provided for termination of the transmission at the will of the receiving station 12 by means of a third receiver coded signal 56. In this regard a tone generator 15 is provided as shown, at the receiving station which can upon activation, transmit a preselected signal 56 through cable 13 which, because of the connection of decode device 21 to the tip and ring sides of the telephone cable can be utilized to disconnect the transmission. In this regard the third receiver code signal 56 would be received by the decode device 21 and activate coil C1 to open relay R1 to deactivate SCR S1 which would disconnect the power supply to unit 31 and terminate the transmission from the receiving end.

In accordance with another feature of the present invention, so long as the communication system is latched as previously described devices within the scope of the present invention can be utilized to actuate auxiliary equipment. In this regard, it will be noted that relays R2-R4 are normally open. By proper selection of a signal characteristic an operator at the receiver 12 utilizing signal transmitter 15 can transmit a signal over the telephone cable 13 to activate one or any number of the decode devices 23-24. In this case the activation of the coils C-2, C-3 or C-4 would then close the corresponding relay R-2, R-3 or R-4 to activate the corresponding SCR S2, SCR S3, or SCR S4 and then activate the operating devices 32, 33 or 34 by power supplied from supply C. In such instances the activating devices 32, 33, or 34 could, for example, be utilized to activate sprinkler systems where the transmitter 8 or where the deactivation of input 2 to the digital communicator 1 would have indicated a fire and an operator at receiver 12 would be able to verify the occurance by listening in at the remote location and then manually and selectively activate the proper response through the tone selected to activate one of the decode devices 21-24.

It is recognized that one unique feature of the present invention is that control of the transmission line is held by the recipient of the communication that is the operator at the receiver 12 and once communication is established he has virtually complete control of response at the activating unit.

It will further be recognized that the foregoing relates to but one arrangement within the scope of the present invention and that various other arrangements also within the scope of the present invention will occur to those skilled in the art upon reading the disclosure set forth hereinbefore.

The invention claimed is:

1. A telecommunication system to operate a selected operating device including a digital code generating device to selectively generate first and second coded signals and having at least one actuating input to receive an actuating signal, a digital coded signal output where upon receipt of said actuating signal at said actuating input said digital code generating device supplies said first coded signal to said digital coded signal output, and a receiver code input; actuating signal generating means; receiver means connected to said digital coded signal output having a receiver input to receive said first and second coded signals, a receiver code output connected to said receiver code input of said digital code generating device and receiver code generator device to generate first receiver coded signals and second receiver coded signals and supply said first receiver code signal to said digital code generating device receiver code input in response to receipt of said first coded signal, and supply second receiver coded signal to said digital code generating device receiver code input in response to receipt of said second coded signal where said first receiver coded signal causes said digital code generating device to generate said second coded signal at said digital coded signal output; latch means operated by the digital code generating device to actuate said operating device upon receipt of said actuating signal; and a third receiver code generating device to selectively provide a third receiver coded signal at said receiver code output and supply said third receiver coded signal to said receiver code input of said digital code generating device to deactivate said latch means to terminate operation of said operating device.

2. The system of claim 1 wherein said digital code generating device includes at least two actuating input means and where each said actuating input means is actuated by a different occurance.

3. The system of claim 1 wherein said digital code generating device is connected to said receiver means by means of a telephone cable.

4. The system of claim 3 wherein said digital code generating device is connected to a central telephone operating station by means of a telephone cable and where said telephone central operating station is connected to said receiver means by a telephone cable.

5. The system of claim 4 wherein said first coded signal is a telephone dial signal received by said central telephone operating station and is converted to a ring signal which is received by said receiver means to make a connection between said digital code generating device and said receiver station and said second coded signal is a signal indicative of the source of generation of said actuating signal.

6. The system of claim 1 wherein said receiver station includes memory means where said memory means is indexed to a selected data file determined by said second coded signal.

7. The system of claim 3 wherein said receiver means includes microphone means and speaker means to provide dual path communication on said telephone cable to said digital code generating device.

8. The system of claim 3 wherein said operating device includes a microphone and speaker actuated by said digital code generating device upon receipt of said actuating signal to provide dual path communication on said telephone cable.

9. The system of claim 8 wherein said latch means includes first and second switch means wherein said first switch means is normally closed and adapted to, upon actuation of said digital code generating device actuate said second switch means to supply power to said operating device and including digital code decoding device means connected to said telephone cable and first switch deactivating means so that upon generation of said third receiver coded signal by said third receiver code generating device, said third receiver coded signal is supplied to said decode means to deactive said first switch means to deactive said second switch means and remove power from said operating device and disconnect said operating device from said telephone cable.

10. The system of claim 9 wherein said operating device includes second operating means and third and fourth latch means wherein said third latch means is normally open and adapted to receive power from said digital code generating device and said fourth latch means is adapted to receive power from said digital code generating device and is normally open and second signal decoding device is connected to said telephone cable to receive a said third receiver coded signal from said third receiver code generating device whereby upon receipt of said third receiver coded signal said second decode device actuates said third latch means to activate said fourth latch means to supply power to said second operating means.

11. The system of claim 1 wherein said actuating signal is a radio frequency signal and said digital code generating device includes a radio frequency receiver adapted to actuate said digital code generating device upon receipt of a selected radio frequency signal.

12. The system of claim 11 wherein said operating device includes microphone and speaker actuating switch means including telephone cable connecting switch means connecting said switch means with said telephone cable wherein said switch means are normally open and are activated upon activation of said digital code generating device to connect said switch means to said telephone cable.

* * * * *